No. 771,893.

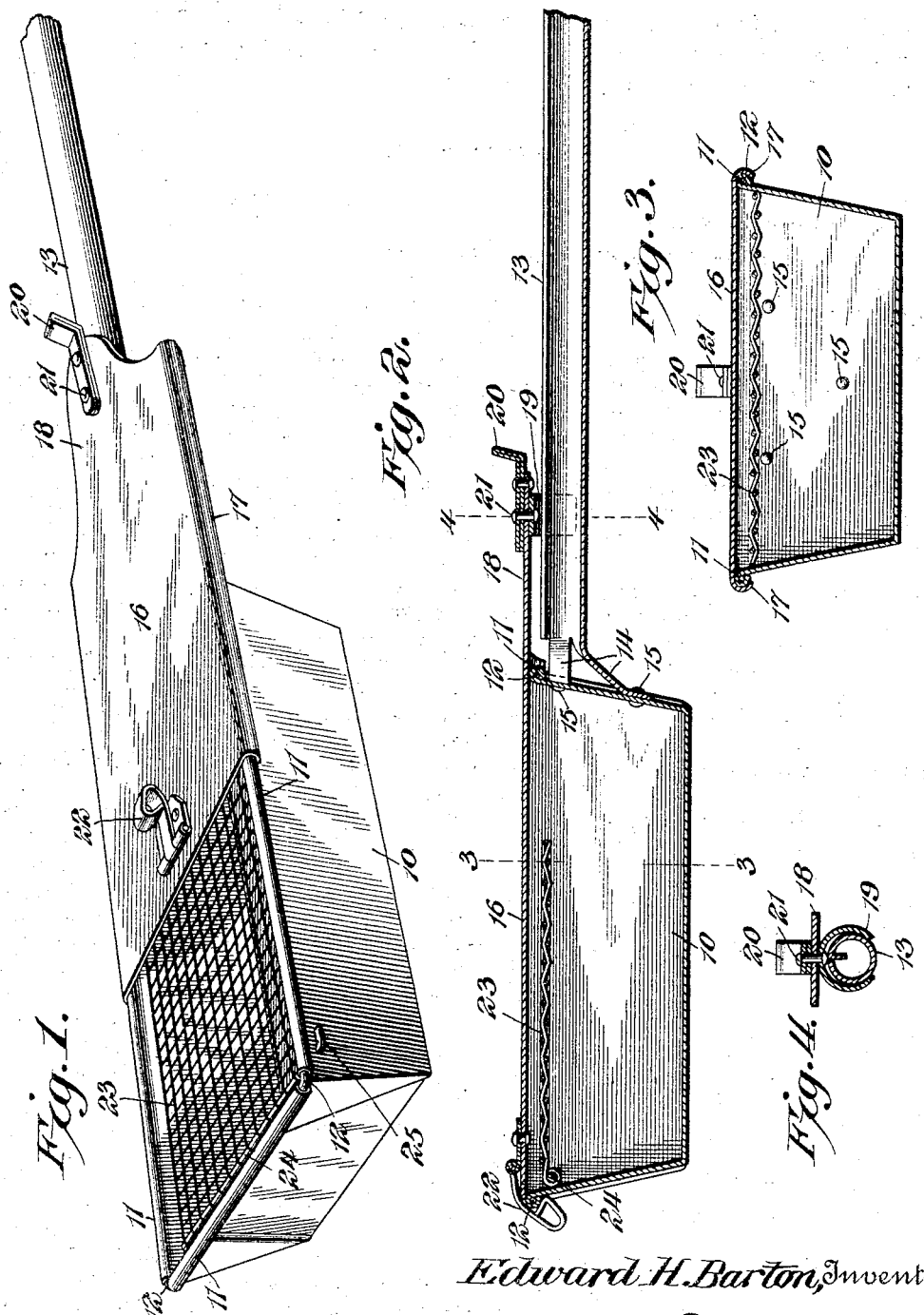

Patented October 11, 1904.

UNITED STATES PATENT OFFICE.

EDWARD H. BARTON, OF STURGIS, MICHIGAN, ASSIGNOR OF THREE-FOURTHS TO WILLIAM T. FAVORITE AND CLARENCE V. SCHERMERHORN, OF STURGIS, MICHIGAN.

POPPER.

SPECIFICATION forming part of Letters Patent No. 771,893, dated October 11, 1904.

Application filed January 28, 1903. Serial No. 140,914. (No model.)

*To all whom it may concern:*

Be it known that I, EDWARD H. BARTON, a citizen of the United States, residing at Sturgis, in the county of St. Joseph and State of Michigan, have invented a new and useful Popper, of which the following is a specification.

This invention relates more particularly to that class of corn-poppers which are placed upon a stove or over a fire and are operated by hand.

It is the object to provide a simple structure which will husband the heat and in which seasoning material may be placed, so that it will thoroughly permeate the corn during the popping operation.

It is also an object to provide novel means whereby the chaff and unpopped corn may be separated from that which is popped, said means serving to hold the latter in the popper and being easily released to open the popper for the purpose of removing the separated and popped kernels.

The preferred form of construction by which these objects are accomplished is illustrated in the accompanying drawings, wherein—

Figure 1 is a perspective view of a popper constructed in accordance with the present invention. Fig. 2 is a longitudinal sectional view through the same. Fig. 3 is a cross-sectional view taken on the line 3 3 of Fig. 2, and Fig. 4 is a cross-sectional view taken on the line 4 4 of Fig. 2.

Similar reference-numerals indicate corresponding parts in all the figures of the drawings.

In the embodiment illustrated a receptacle 10 is employed, which is rectangular in form and preferably constructed of sheet metal, the walls being imperforate and having outstanding beads 11 at their upper edges, a wire rim-piece 12 being passed through these beads and serving to strengthen the upper portions of the walls. A handle 13 is secured to one end of the receptacle and is formed of sheet metal bent to tubular form and split at one end to provide a plurality of fingers 14, which are bent outwardly and riveted, as shown at 15, to the adjacent end wall of the receptacle.

An imperforate cover 16 is slidably mounted upon the upper portion of the receptacle 10, and to this end the side edges 17 of said cover are bent downwardly and inwardly to form flanges which engage over the beads 11 of the side walls. The inner end of the cover projects, as shown at 18, over the handle 13 and is provided with a keeper in the form of a stirrup 19, that slidably embraces the handle. An upstanding finger-piece 20 is also secured to this projecting end, said finger-piece and stirrup being connected by a rivet 21, that passes through both and also through the cover. The opposite end of the cover carries a pivoted latch 22, which is arranged to engage over the end bead, and thus hold the cover in its closed position. Another cover, which is perforate and is designated by the reference-numeral 23, is pivoted to the front end of the receptacle by means of a rod 24, the ends of which are passed through the side walls of said receptacle and are bent at right angles, as shown at 25, whereby the rod is held against displacement. The side edges of this cover rest against the inner faces of the inclined walls of the receptacle, and in this manner the cover is held in horizontal position. In practice the said cover is in the form of a comparatively coarse-mesh wire screen and constitutes a separator which will permit the passage of the chaff and unpopped corn and will retain the properly-popped kernels. By referring to Fig. 2 it will be seen that this perforate cover or separator terminates short of the rear end of the receptacle and only covers about two-thirds of the top.

The popping operation is performed in substantially the usual manner, with the exception that the seasoning material is placed directly in the receptacle with the corn, and the imperforate cover is placed in its closed position, as shown in Fig. 2. As a result the heat will be conserved, and, furthermore, the melted butter or other similar material employed cannot spatter over the stove. After the corn has been popped the cover 16 is partly withdrawn, though its front end must overlap the rear end of the perforate cover or screen. The popper is then reversed and shaken, whereupon the chaff and unpopped kernels will gravitate through the screen, while the popped corn will be retained thereby in the receptacle, the screen being held closed by the overlapped end of the imperforate cover. To open the receptacle, it is only necessary to slide the imperforate cover so that the screen will be free of the same, whereupon by inverting the receptacle said screen will swing to open position and the popped and separated corn will drop therefrom. It will be apparent that this device can be manufactured at small cost, and, as shown above, it accomplishes all the objects set forth in the preliminary portion of the specification.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is—

1. In a popper, a receptacle-body, an inner perforate cover movably mounted on the body and extending but partially across the same, and an outer imperforate cover extending over the inner cover and constituting means for holding said inner cover against movement in one direction upon the body.

2. In a popper, a receptacle, a pivoted cover for the receptacle, and a sliding cover for the receptacle, said sliding cover constituting securing means for holding the pivoted cover against its swinging movement in one direction.

3. In a popper, a receptacle, a cover constructed of comparatively large mesh netting pivoted at one end to the receptacle and terminating short of the other end, and another cover slidably mounted on the upper edges of the receptacle and movable over the pivoted cover serving to hold the same against opening when the receptacle is reversed.

4. In a popper, a receptacle, a perforate cover pivoted to the receptacle and terminating short of one end thereof, and a sliding cover movable over the free end of the pivoted cover to hold said pivoted cover against swinging.

5. In a popper, a receptacle having a handle at one end, and a pivot-rod extending across the other end, said receptacle also having outstanding beads at its upper side edges, a swinging perforate cover secured at one end to the pivot-rod, and a slidable cover having inturned flanges at its edges that engage over the beads of the receptacle, said cover being movable over the perforate cover.

6. In a popper, the combination with a receptacle having an open portion, of a swinging cover extending over a part of the open portion, and a sliding cover mounted on the receptacle and movable over the remaining part of the open portion not closed by the swinging cover.

7. In combination with the receptacle having an open side, the swinging cover extending over a part of the open side of the receptacle, and a sliding cover located in a different plane from the swinging cover, and being coextensive with the open side of the receptacle, so as to slide over the swinging cover.

In testimony that I claim the foregoing as my own I have hereto affixed my signature in the presence of two witnesses.

EDWARD H. BARTON.

Witnesses:
  C. W. LANNING,
  GRANT NIBLACK.